United States Patent [19]

Forslund

[11] Patent Number: 4,559,733

[45] Date of Patent: Dec. 24, 1985

[54] SIGNBOARD RACK

[76] Inventor: Hans Forslund, Baggebytorg 8, S-181 35 Lidingö, Sweden

[21] Appl. No.: 596,157

[22] Filed: Apr. 2, 1984

[51] Int. Cl.[4] ............................................. G09F 15/00
[52] U.S. Cl. ................................... 40/606; 40/10 R; 40/152.1; 403/402
[58] Field of Search .................. 40/10 R, 16 R, 152.1, 40/152, 155, 606; 403/402

[56] References Cited

U.S. PATENT DOCUMENTS

| | | | |
|---|---|---|---|
| 2,297,574 | 9/1942 | McCord | 40/152.1 |
| 2,540,995 | 2/1951 | Roeder | 403/402 |
| 3,514,886 | 6/1970 | Drakard | 40/155 |
| 3,711,974 | 1/1973 | Webb | 40/606 |
| 4,237,636 | 12/1980 | Mathews | 40/155 |

FOREIGN PATENT DOCUMENTS 1464679  11/1966  France ............................... 403/402

Primary Examiner—John J. Wilson
Assistant Examiner—Wenceslao J. Contreras
Attorney, Agent, or Firm—LeBlanc, Nolan, Shur & Nies

[57] ABSTRACT

A signboard rack according to the invention is designed to receive at least two opposite side edges of a signboard (4) or the like. The signboard rack includes longitudinal bars (1) of uniform cross-section which are adapted for interconnection at generally right angles relative to each other and consist each of a hollow profile having a longitudinally extending slit (3), and connection members (2) interconnecting said bars and consisting each of a first part insertable in said hollow in one of the profiled bars and also a second part joined with the first part via said slit and insertable in the end of another one of the profiled bars, while the first part is fixable in the intended position along the profiled bar associated therewith in that the second part can be acted upon in such a way that the first part will be fixed or released relative to said hollow.

The connection member is preferably made in one piece of an elastically yieldable material and is fixed in position in the profiled bars by spring action.

5 Claims, 10 Drawing Figures

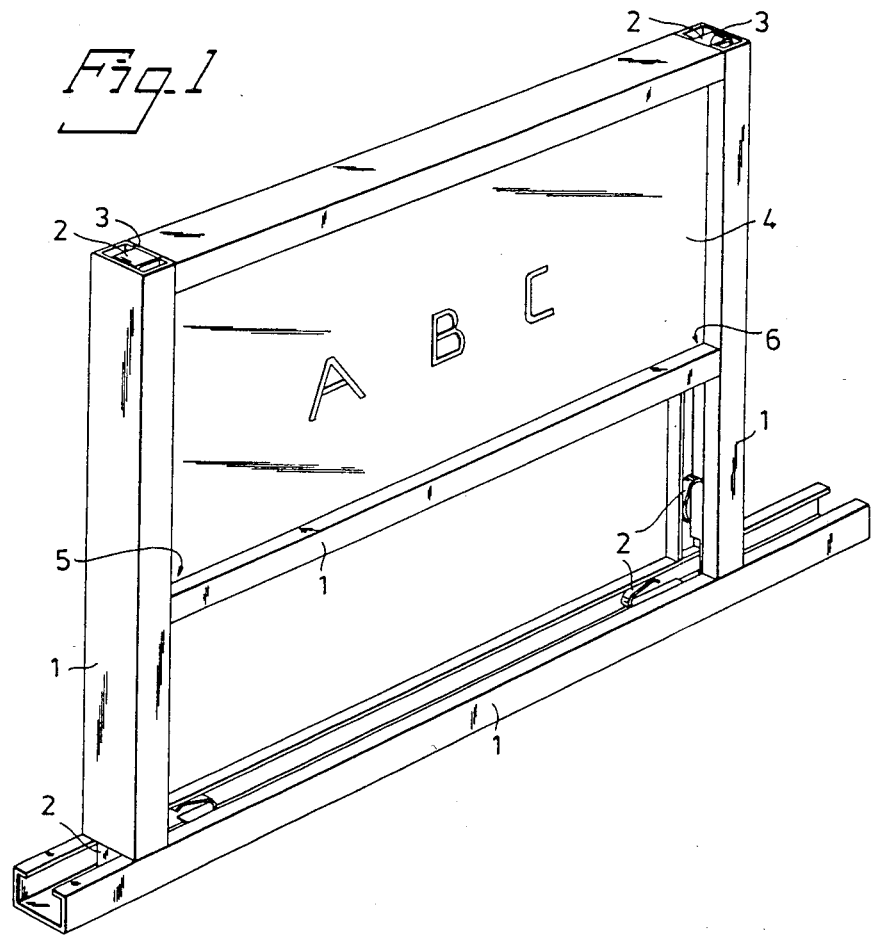

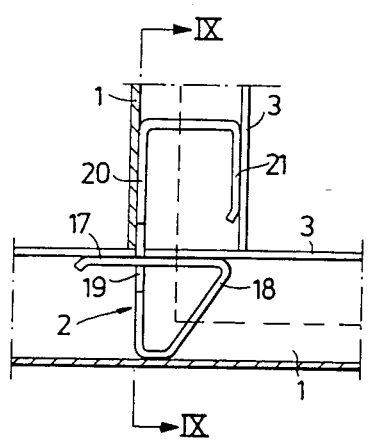
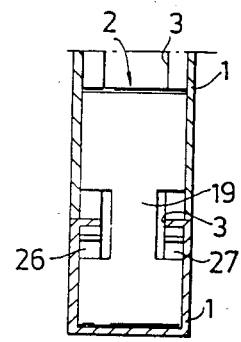
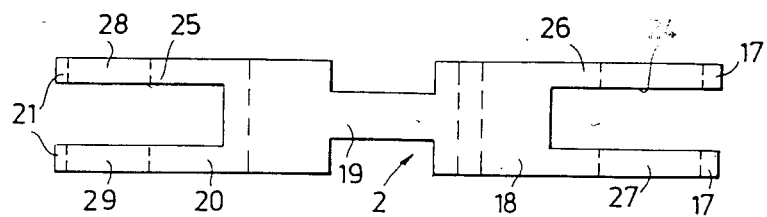

SIGNBOARD RACK

The present invention relates to a signboard rack for receiving at least two side edges of a signboard or the like, said rack comprising bars of uniform cross-section cut to suitable lengths and adapted for interconnection at generally right angles relative to each other and consisting each of a lollow profile including a longitudinally extending slit, and connection members, made each in one piece, interconnecting said bars and consisting each of a first part insertable in said hollow in one of the profiled bars and also a second part joined with the first part via said slit and insertable in the end of another one of the bars and displaceable therein.

It must be possible to assemble and disassemble such signboard racks rapidly and simply as they mostly are used temporarily and for very short time periods and are intended to receive signboards of various sizes. Such signboard racks may be suitable for use e.g. in department stores, grocery shops or the like in order to inform the customers of articles of reduced price and other offers. The time during which a signboard is to be up in a department store may sometimes be restricted to parts of a working-day and thus it is understood that high demands must be made for flexibility and simplicity of the rack.

Prior art signboard racks of this type usually include complicated profiles or connection members, especially when the component profiled bars are to be lockable to each other in intended positions. It often is necessary to make incisions in the ends of such profiles, such as holes for receiving resilient pins on the connection member.

It may also take much time to assemble and disassemble the rack in case the construction of the connection member is such as to necessitate screwing it up to the profiled bars to be interconnected. It is usual that such signboard racks as include relatively adjustable profiled bars have holes throughout their length or other localizing markings to enable safe relative adjustment of the bars in predetermined positions. However, when the signboards to be carried are small-sized or have a comparatively low weight, as is often the case with the above-mentioned signboards used in department stores or the like, the lockability required is not so high.

The object of the present invention is thus to provide a signboard rack the components of which, i.e. the profiled bars and the connection members, are simple and cheap in manufacture and which can be mounted quickly in order to fit signboards of varying sizes and quickly disassembled after use.

This object is achieved in accordance with the invention in that the first and second parts are joined with one another via a section of reduced width intended to extend through said slit, the bars have supporting means arranged on the inside and longitudinally thereof, that said first and second parts consist each of a flat section bearing on said inside supporting means and a section extending from one end of said flat section towards the inner wall right opposite the bar wall provided with slits, said section being joined with the section of reduced width, whereby the connection member is adapted to provide, for the accomodation of a signboard or the like, a continuous transition in said slits at a junction between two bars.

The invention will be decribed more in detail below with reference to the accompanying drawings which show preferred embodiments and in which:

FIG. 1 is a perspective view of a signboard rack according to the invention in mounted condition and carrying a signboard;

FIG. 2 is a perspective view of a first embodiment of a connection member included in the rack according to the invention;

FIG. 3 is a cross-section through a junction between two profiled bars in the rack of the invention, showing the connection member according to the embodiment of FIG. 2 fitted in position;

FIG. 8 is a view similar to those of FIGS. 3, 4 and 6 showing a fourth embodiment of the connection member;

FIG. 9 is a view on line IX—IX in FIG. 8; and

FIG. 10 is a plan view of a blank used in making the connection member according to the embodiments of FIGS. 1, 2, 3, 4, 5, 8 and 9.

Figure 4:
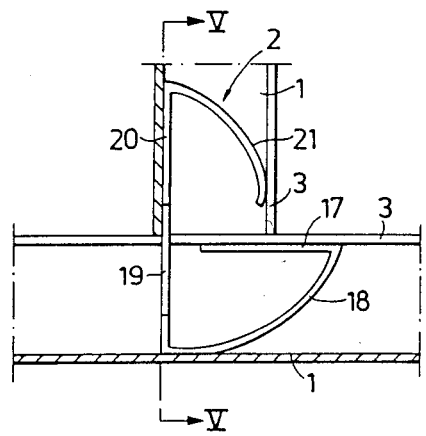
FIG. 4 is a view similar to that of FIG. 3, showing a second embodiment of the connection member.

FIG. 1 shows a signboard rack in mounted condition according to the invention including bars generally designated 1 and connection members 2 interconnecting these profiled bars. The bars 1 are adapted for interconnection at generally right angles to each other, the end of one bar at a junction beint joined with another bar throughout the length thereof. Thus the latter bar may extend past the signboard and is in that case attached, for instance, to an additonal bar which, again, may be secured to a supporting base such as the flat surface of a counter or a wall in a department store, grocery shop or the like. As is apparent from FIG. 1 the bars consist of hollow profiles of uniform cross-section. The cross-section of the hollow profile is preferably rectangular and has a longitudinally extending slit 3. Consequently the bars 1 may be extruded and then be cut to suitable lengths. A signboard 4 in FIG. 1 is received between four profiled bars 1 and the vertical side edges of the signboard are fitted in said slits 3 in the bars 1. The lower long side of the signboard is received in the horizontal bar 1 extending under the signboard. In constructing the signboard according to the invention it has been taken into account that it should be possible to fit the signboard in the slits without making any recess at the corners of it.

Referring now to FIGS. 2 and 3 there is shown a first embodiment of a connection member for interconnection of two profiled bars 1. This connection member is symmetrical and consists of a first part insertable in said hollow in one of the profiled bars and also a second part 8 joined with the first part via said slit 3 and insertable in the end of another one of the bars and displaceable therein. The first and second parts of the connection member are joined with one another via a section 9 of reduced width intended to extend through said slit 3. The first and second parts consist each of a flat section 10 bearing on the inner wall provided with the slit 3 and a section 11 extending from one of said flat section towards the inner wall right opposite the bar wall provided with slits, said section 11 being joined with the section 9 of reduced width, whereby the connection member has recesses 12 and 13 to provide, for the accomodation of a signboard or the like, a continuous transition in said slits at a junction between two bars.

When a signboard according to the invention is to be mounted on a wall or on a bench in a department store or the like, a profiled bar may be screwed up on the wall, bench or the like by screws being suitably inserted into holes made beforehand in that inner wall of the profiled bar 1 which is situated opposite the slit.

Figure 5:
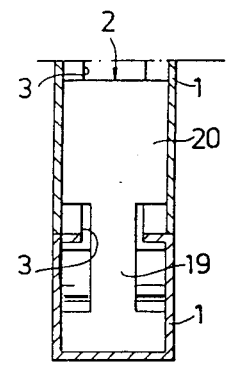
FIG. 5 is a cross-section on line V—V in FIG. 4.

FIGS. 4 and 5 show a second embodiment of a connection member according to the invention. The connection member is, as in the embodiment of FIG. 1 preferably made of elastically yieldable material and consists of a pinched-out plate which has been bent into the intended shape. The connection member may also be moulded of plastic material in one piece into the intended shape. The connection member consists of a first part which includes a section 17 bearing on that wall of a bar 1 which is provided with the slit, an intermediate section 18 extending from the slit wall of the bar to the opposite wall thereof, and a section 19 of reduced width passing freely through said slit 3. The connection member also includes a second part intended to be inserted in the end of another bar 1 and consisting of a straight section 20 bearing on an inner wall of a bar 1 and a bent section 21 which extends up to and bears resiliently on the opposite wall of the bar. To move the connection member to other positions along the lower bar one pulls the bent section 21 and displaces the connection member along said bar.

Figure 6:
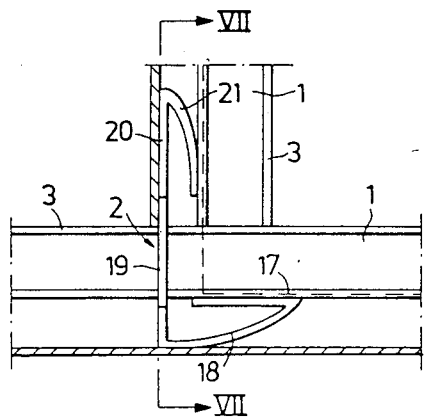
FIG. 6 is a view similar to that of FIGS. 3 and 4 showing a third embodiment of the connection member.
Figure 7:
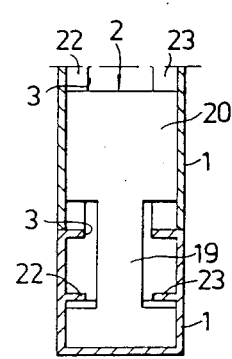
FIG. 7 is a view on line VII—VII in FIG. 6.

FIGS. 6 and 7 show a third embodiment of the connection member which is a development of the connection member of FIGS. 4 and 5. The details in the embodiment of FIGS. 6 and 7 have the same reference numerals as the corresponding details in FIGS. 4 and 5. The difference between the embodiments of FIGS. 6 and 7 and the embodiment of FIGS. 4 and 5 is that the bar 1 in the embodiment of FIGS. 6 and 7 has been provided with longitudinal flanges 22 and 23 which are disposed right opposite each other in the hollow and on which the straight section 17 and the bent section 21 bear. This gives a continuous transition in the slit between the two bars so that the signboard can be placed in accordance with the dashed line in FIG. 6.

FIGS. 8, 9 and 10 show a fourth embodiment of the connection member which strongly resembles the connection members according to FIGS. 1–5. Recesses 24 and 25 have been formed on the connection member, as is apparent from FIG. 10 which shows a blank for such a connection member. A signboard can thus be inserted in the recesses 24 and 25 between defining shanks 26, 27 and 28, 29. For further strength the straight bearing section 17 of the first part has, as appears from FIG. 8, been led past the section of reduced width extending through the slit, which results in increased stability. A mounted signboard is indicated by dashed lines in FIG. 8.

I claim:

1. Signboard rack for receiving at least two side edges of a signboard (4) or the like, said rack comprising bars (1) of uniform cross-section cut to suitable lengths and adapted for interconnection at generally right angles relative to each other and consisting each of a hollow profile including a longitudinally extending slit (3), and connection members (2) made each in one piece, interconnecting said bars and consisting each of a first part insertable in said hollow in one of the profiled bars and also a second part joined with the first part via said slit and insertable in the end of another one of the bars and displaceable therein, characterized in that the first and second parts are joined with one another via a section of reduced width (9, 19) intended to extend through said slit (3), the bars (1) have supporting means arranged on the inside and longitudinally thereof, that said first and second parts consist each of a flat section (10,17) bearing on said inside supporting means and a section (11, 18) extending from one end of said flat section towards the inner wall right opposite the bar wall provided with slits, said section (11, 18) being joined with the section of reduced width, whereby the connection member is adapted to provide, for the accomodation of a signboard or the like, a continuous transition is said slits at a junction between two bars.

2. Signboard rack as claimed in claim 1, characterized in that said supporting means consists of the slit inner wall of the bar (1) and that the first and second parts of the connection member are provided with recesses (12, 13, 24, 25) on at least the sides facing the slits (3) of the bars (1) in order to provide, for the accomodation of a signboard or the like, said continuous transition in said slits at a junction between two bars.

3. Signboard rack as claimed in claim 1, characterized in that said supporting means consist of opposite flanges (22, 23) arranged longitudinally on the insides of the bar in order to provide, for the accomodation of a signboard or the like, said continuous transition in said slits at a junction between two bars.

4. Signboard rack as claimed in any of claims 1, 2, or 3 characterized in that the second part of the connection member (2) is retained in the ends of the bars (1) by spring action.

5. Signboard rack as claimed in any of claims 1, 2, or 3 characterized in that the second part the connection member (2) is retained in the ends of the bars (1) by frictional action.

* * * * *